United States Patent Office 3,419,981
Patented Jan. 7, 1969

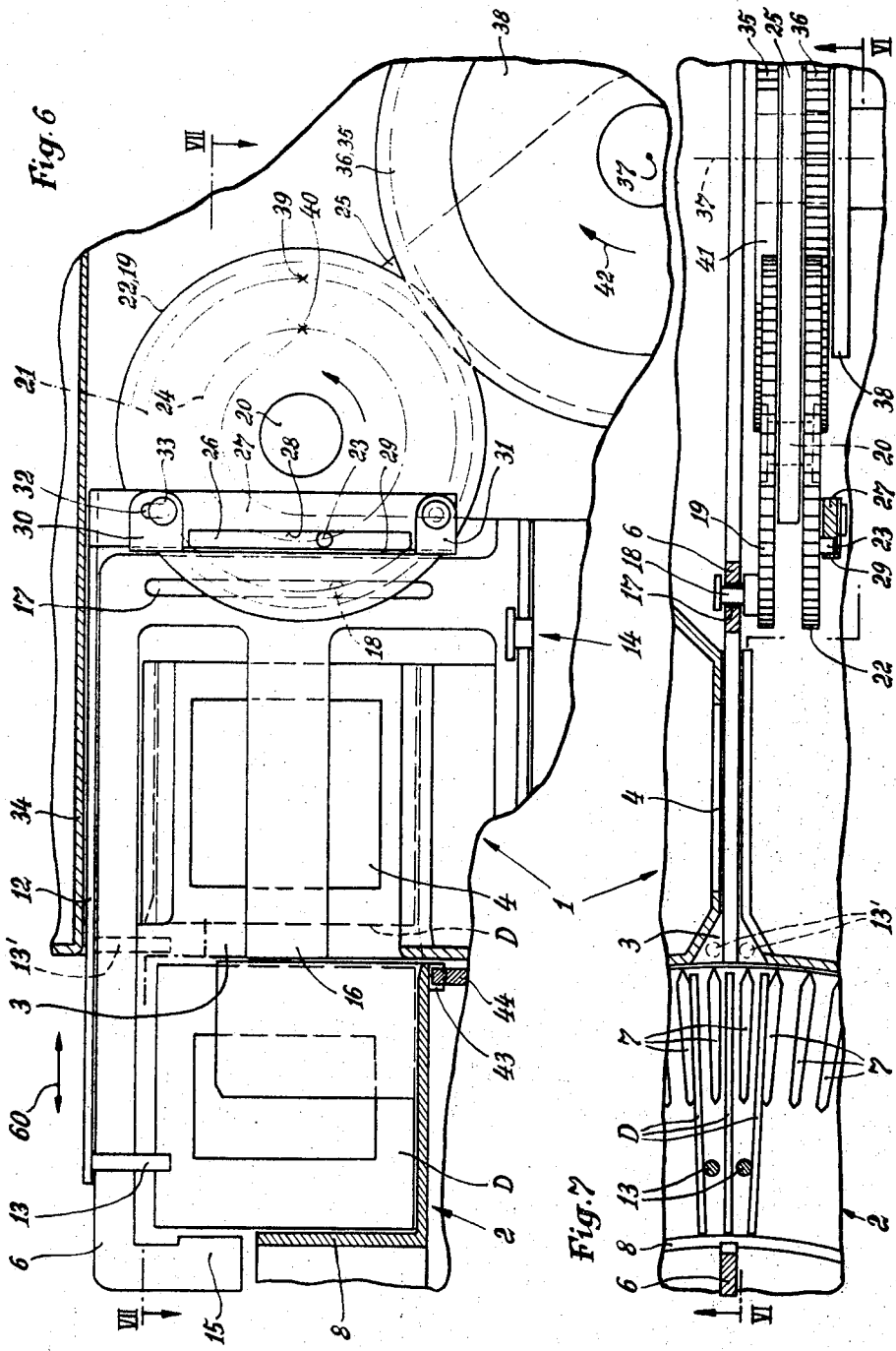

3,419,981
SLIDE-CONTROLLING STRUCTURE FOR
PHOTOGRAPHIC PROJECTORS
Erich Zillmer, Braunschweig, Germany, assignor to Voigt-
lander A.G., Braunschweig, Germany, a corporation of
Germany
Filed Mar. 22, 1966, Ser. No. 536,423
Claims priority, application Germany, Mar. 23, 1965,
Z 11,425
U.S. Cl. 40—79                                    8 Claims
Int. Cl. G09f 11/30

ABSTRACT OF THE DISCLOSURE

In a photographic projector having a slide changing structure, a slide changing means of the projector is provided which has an operating cycle whereby a slide is moved from a magazine to a projecting position and then back to the magazine. The projector has a deflector carrier carrying a pair of deflectors with a drive connected to the deflector carrier to move it during the above cycle of the slide changing means from a raised position wherein the deflectors are beyond the range of the slides to an operating position wherein the deflectors respectively deflect slides which immediately precede and follow the slide acted upon by the slide changing means to deflect from the latter slide, the immediately preceding and following slides, so as to prevent the slide changing means from engaging the immediately preceding and following slides.

---

The present invention relates to photographic projectors.

In particular, the invention relates to photographic projectors having a slide-changing means which displaces a slide from a compartment in a magazine to a projecting position and then back into the magazine, the slide-changing means during its successive operating cycles displacing successive slides from successive magazine compartments respectively to the projecting position and then back to the magazine compartments.

With photographic projectors of this general type, there is a likelihood of malfunctioning of the slide-changing means primarily for the following reasons:

The compartments of the magazine are made large enough to accept slides of maximum thickness. When, however, slides of less than maximum thickness are situated in the magazine compartments, it is possible for the slides to assume tilted positions in the magazine compartments so that the parts of the slides which project outwardly beyond the magazine to be acted upon by the slide-changing means, can become situated so close to each other that the slide-changing means will act not only on the particular slide which should be displaced to the projecting position but also on the next-following or the immediately preceding slide. A possibility of this type of malfunctioning is particularly great with projectors which use circular magazines of the type where the partitions which define the magazine compartments extend from the outer periphery of the magazine only part of the way toward the inner periphery thereof so that these partitions extend across only part of the magazine compartments. At the inner periphery of the magazine, from which the slide-changing means moves into the magazine, it is possible for the slides, which are not separated from each other by any partition at the inner periphery of the circulation magazine, to be situated so close to each other that in this event the slide-changing means can simultaneously displace a pair of adjoining slides.

It is, therefore, a primary object of the present invention to provide a for a photographic projector a structure which will prevent malfunctioning of the above type.

It is, furthermore, an object of the invention to provide a structure which while reliably preventing such malfunctioning is at the same time exceedingly simple.

Also, the objects of the present invention include the provision of a structure which will guarantee operation of the slide-changing means only on the one slide which should be displaced to the projecting position while at the same time maintaining the structure of the projector exceedingly compact and requiring the addition of only a small number of components to a conventional projector, so that in this way the size of the projector is not increased with the structure of the invention and the cost thereof also is not materially increased.

According to the present invention there is combined with a slide-changing means which has an operating cycle during which it displaces a slide from a magazine to a projecting position and back to the magazine, a deflector-carrier and a pair of deflectors carried thereby, as well as a drive means which is operatively connected with the deflector-carrier to displace the latter, during each operating cycle of the slide-changing means, from a rest position where the deflectors are situated beyond the range of the slides in the magazine to an operating position where the deflectors respectively deflect the slides which immediately precede and immediately follow the slide to be moved to the projecting position away from this latter slide so as to reliably maintain the slide-changing means in engagement only with that one of the slides which is in position to be displaced to and from the projecting position.

The invention is illustrated by way of example in the accompanying drawings which form part of this application and in which.

Figure 3:
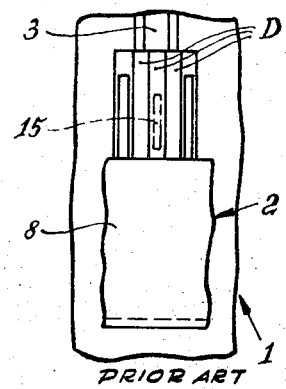
FIG. 3 is a fragmentary side elevation of the structure of FIG. 1 as seen from the left side of FIG. 1.
Figure 4:
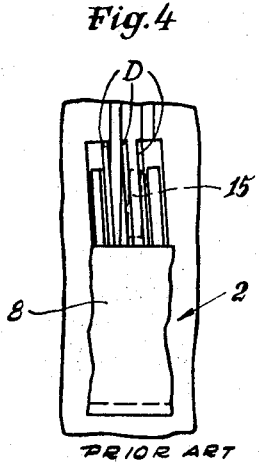
FIG. 4 is a side elevation showing the same structure as that of FIG. 3 but illustrating the conditions where the slides are of a lesser thickness than the slides of FIG. 3, FIGS. 3 and 4 showing the structure on a scale smaller than that of FIG. 1.
Figure 5:
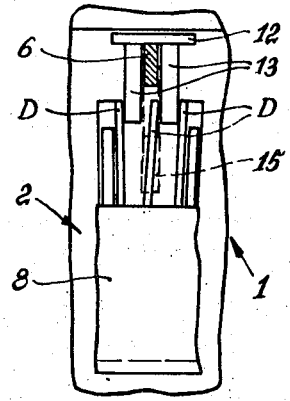

FIG. 5 also shows the structure of FIGS. 3 and 4, but this structure is shown in FIG. 5 in cooperation with the structure of the present invention;

FIG. 6 is a fragmentary partly sectional elevation of a projector provided with the structure of the present invention, FIG. 6 being taken along line VI—VI of FIG. 7 in the direction of the arrows, and showing that part of the projector which is situated in the region of a slide which is located at the projecting position; and FIG. 7 is a sectional plan view of the structure of FIG. 6 taken along line VII—VII of FIG. 6 in the direction of the arrows.

Referring now to FIGS. 1–4, there is illustrated therein the problem which is recognized and solved by the present invention.

Figure 1:
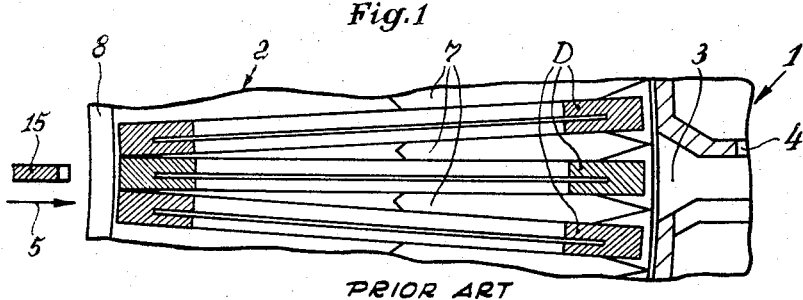
FIG. 1 is a fragmentary sectional plan view of a photographic projector and part of a circular magazine cooperating therewith.

FIG. 1 shows in a fragmentary plan view part of a photographic projector 1 together with part of a circular magazine 2 which receives the slides D. The central one of the three illustrated slides D is situated in alignment the guide channel 3 which guides the slide to the imaging window 4 with which a slide is aligned when the slide is in the projecting position. When the part 15 of the slide-changing means moves in the direction of the arrow 5 of FIG. 1, this central one of the three slides D shown in FIG. 1 is displaced into the guide channel 3 and is shifted to the projecting position in alignment with the window 4.

The particular circular magazine 2 which is shown in FIG. 1 is provided with partition walls 7 which define the slide compartments between themselves, so that the slides D are received between the compartment partitions 7. These partitions do not extend across the entire width of the magazine. Instead they extend from the outer periphery of the magazine only part of the way across the latter. When the slide compartments, as illustrated, are filled with slides D of maximum thickness, these slides are located closely next to each other in the region of the inner peripheral wall 8 of the magazine which closes the compartments at the inner periphery of the circular magazine. The part 15 of the slide-changing means, since it has a thickness smaller than that of the maximum slide thickness, can, in this case, safely come into engagement only with that one of the slides D which is in alignment with the channel 3, without any engagement between the slide-changing means and the slides which immediately precede and immediately follow the slide which is aligned with the channel 3. These conditions are particularly apparent from FIG. 3 which shows the relationship between the parts on a scale smaller than that of FIG. 1.

Figure 2:
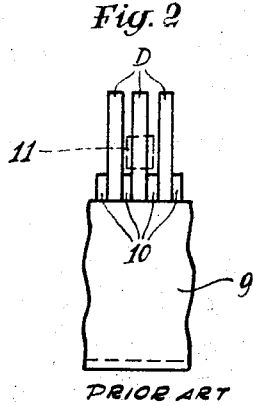
FIG. 2 is a fragmentary side elevation of a portion of a straight magazine.

FIG. 2 shows, in the same type of illustration as that of FIG. 3, the conditions in a projector which can receive an elongated straight magazine 9 provided with compartment-defining partitions 10 which extend across the entire width of the magazine to define the spaces which receive the several slides D. When the compartments of the magazine of FIG. 2 accommodate slides of maximum thickness which completely fill the compartments, the slides are situated, as illustrated in FIG. 2 at such a distance from each other that even a slide-engaging element which is thicker than the individual slides, such as the element 11 of the slide-changing means, will reliably engage only that one of the slides which should be displaced to the projecting position, and in this case there is no possibility of engagement of the immediately preceding and immediately following slides by the part 11 of the slide-changing means.

FIG. 4 shows the same structure as that of FIG. 3 illustrated in the same manner as in FIGS. 2 and 3, the magazine 2 of course having partitions which extend only part of the way across the magazine from its outer periphery. In the conditions which are illustrated in FIG. 4, the compartments of the magazine receive slides which are of less than maximum thickness. In this case, the slides are not situated directly in closely spaced relationship one next to the other at the inner wall 8, as is the case in FIGS. 1 and 3. Instead, these slides which are of less than maximum thickness can assume tilted positions in the magazine compartments and can therefore take the positions illustrated in FIG. 4. Now, the part 15 of the slide-changing means can, during its movement, as indicated simultaneously engage two slides D, so that a malfunctioning of the slide-changing cycle can occur.

FIGS. 5-7 show one possible embodiment of a structure according to the invention which even if the conditions are as shown in FIG. 4 will nevertheless guarantee a safe functioning of the slide-changing mechanism without any possibility of displacing two or more slides simultaneously.

As is shown in FIG. 5, which schematically illustrates the conditions provided with the present invention in the same way as in FIGS. 2-4, a deflector-carrier 12 moves to its operating position during the slide-changing cycle. This deflector-carrier 12 carries a pair of deflectors 13 which are located in the region of the slide which is engaged by the part 15 of the slide-changing means 6 and which deflect the immediately preceding and the immediately following slide so far beyond the path of movement of the part 15 that these latter slides cannot be engaged by the part 15. Therefore, when conditions such as those shown in FIG. 4 are present, the malfunctioning referred to above cannot occur during the slide-changing cycle with the structure of the present invention.

The structure of the invention is shown in greater detail in FIGS. 6 and 7 where the circular magazine 2 accommodates, not slides of maximum thickness as shown in FIGS. 1 and 3, but rather slides D of less than maximum thickness.

As is indicated in FIG. 6, the slide-changing means 6 is guided by a suitable guiding structure 14 for movement back and forth in the direction indicated by the double-headed arrow 60. This slide-changing means 6 is provided with the part 15 which pushes the slides from the magazine to the projecting position, and the slide-changing means 6 has an opposed slide-engaging part 16 which returns each slide from the projecting position, in alignment with the window 4, back into the magazine 2. The slide-changing means 6 is provided with a control slot 17 with which a drive means cooperates for reciprocating the slide-changing means 6 through its operating cycle. This drive means includes a drive pin 18 which extends into the slot 17 and which is fixedly carried by a rotary gear 19 which is mounted for free rotary movement on shaft 20 carried by an intermediate wall 25 of the projector. During rotation of the gear 19 of the drive means, the pin 18 thereof describes the circle 21 shown in dotted lines, and during one revolution of the gear 19, the slide-changing means 6 will be driven back and forth through a complete slide-changing cycle.

The shaft 20 serves also to support for free rotary movement a gear 22 of a drive means for the deflector carrier 12. This gear 22 of the drive means for the deflector carrier is of the same outer diameter as the gear 19. Also, this drive means for the deflector carrier includes a pin 23 which is fixed to the gear 22 for rotary movement therewith, and during a revolution of the gear 22 the pin 23 will describe the circle 24 shown in dotted lines in FIG. 6. The diameter of the circle 24 is smaller than the diameter of the circle 21 described by the pin 18. The stroke of the carrier 12, derived from the drive pin 23, is therefore shorter than the stroke of the slide-changing means 6. The drive pin 23 extends into a control slot 26 for the purpose of transmitting the drive to the deflector carrier 12 which is in the form of a simple strip of metal, for example, having a control arm extending angularly down therefrom in the manner shown most clearly in FIG. 6. This arm 27 is formed with part of the slot 26. Thus, the arm 27 is formed with an elongated notch 28 which defines part of the slot 26. The slot 26 is completed by a yieldable transmission means which includes an elongated leaf spring 29 which closes the notch 28 so as to define the slot 26 into which the pin 23 extends. The elongated leaf spring 29 has a pair of lugs 30 and 31 angularly bent therefrom and overlapping the surface of the arm 27 which is visible in FIG. 6. Suitable rivets or the like extend through the lugs 30 and 31 and the arm 27 for mounting the leaf spring 29 thereon. While the lug 31 is rigidly fixed with the arm 27, the lug 30 is formed with a vertically extending slot 32 through which the shank of the fastening rivet 33 or the like extends, so that the lug 30 is vertically slidable with respect to the arm 27. As a result of this connection of the leaf spring 29 to the arm 27 it is possible for the leaf spring to yield to the left, as viewed in FIG. 6, bowing outwardly toward the left while the top end of the slot 32 approaches the rivet 33. This yielding of the yieldable transmission means formed by the leaf spring 29 can take place under conditions described below.

The elongated strip which forms the deflector carrier 12 rests slidably on the upper edge of the slide-changing means 6 and is, on the other hand, guided by a horizontal wall 34 which is situated over the slide-changing means 6 to define with the latter a space in which the carrier 12 is accommodated. The pair of deflectors 13 are in the form of pins fixed to the carrier 12 adjacent the left end thereof, as viewed in FIG. 6, and extending downwardly therefrom on opposite sides of the slide-changing means 6, respectively. The deflector pins 13 are long enough to extend into the range of the slides D.

The drive means for the slide-changing means 6 and the drive means for the deflector carrier 12 are both driven from a common source of motion transmission which includes a gear 35 meshing with the gear 19 and a gear 36 meshing with the gear 22. The gears 35 and 36 are driven by a common shaft 37 which carries both of these gears and which provides for them the common axis of rotation 37 indicated in dot-dash lines in FIG. 7. Coaxial with the common drive shaft 37 is a driving disc 38 of the motion-transmitting means which is common to both of the drive means for the slide-changing means and the deflector carrier, and this driving disc 38 which drives the shaft 37 is driven from a motor in a known manner, in such a way that the drive disc 38 carries out during a slide-changing cycle a single full revolution and rotates therewith the gears 35 and 36 which are fixed to each other for rotation together.

The above-described structure operates in the following manner during a slide-changing cycle.

Assuming that the slide-changing means 6, instead of being positioned at the magazine 2 as shown in FIGS. 6 and 7, is in the position where a slide situated between the parts 15 and 16 is in the projecting position in alignment with the window 4, so that a slide D is in the projecting position shown in dotted lines in FIG. 6, then the gear 19 has an angular position where the drive pin 18 is located at the x-mark 39 of the circular path of movement 21 of the pin 18.

In this starting position the drive pin 23 for the deflector carrier 12 is located at the x-mark 40 of its circular path of movement 24. The carrier 12 has at this time a position where the deflectors 13 are in the rest position 13' shown in dotted lines in FIGS. 6 and 7, and in this rest position of the deflectors they are situated beyond the range of the magazine 2.

While the drive gears 19 and 22 are provided at their outer peripheries with gear teeth which are distributed along the entire outer peripheries of these gears, the drive gears 35 and 36 which respectively mesh with the gears 19 and 22 are not provided with teeth distributed over their entire outer peripheries. Thus, FIG. 7 shows a portion 41 of the outer periphery of the gear 35 which is not provided with gear teeth.

During a slide-changing cycle, the motion-transmitting disc 38 rotates in the direction of the arrow 42 shown in FIG. 6, and the drive gears 35 and 36 will therefore rotate with the disc 38 as a single unit. While the gear 35 will immediately rotate the gear 19, initially a part of the periphery of the gear 36 which does not have any teeth turns with respect to the gear 22, so that during the return of a slide to the magazine by the slide-changing means, the gear 22 remains stationary. Thus, the slide-changing means 6 will be moved to the left, as viewed in FIGS. 6 and 7, by the drive gear 19 so that the slide which previously was in the projecting position is returned back into the magazine 2. In this way, the slide-changing means 6 reaches the position shown in FIGS. 6 and 7, and in this position of the slide-changing means, while the deflectors remain in their rest position 13', the magazine 2 is advanced by an angular increment which will situate the next slide in position to be projected. This increment of turning of the magazine 2 is brought about in a known way by way of the ring gear 43 fixed to the lower peripheral portion of the magazine 2 and meshing with a magazine-advancing pinion 44, which is actuated by the magazine-advancing structure so as to situate the next slide in alignment with the channel 3. In this way another slide is brought into the operating range of the slide-changing means 6. Now the portion 41 of the gear 35 which does not have any teeth comes into the range of the teeth of the gear 19, so that the gear 19 now remains stationary.

On the other hand, the portion of the periphery of the gear 36 which does not have any teeth as now turned beyond the gear 22, and the teeth of the gear 36 now mesh with the gear 22 so as to rotate the drive gear 22. The deflector carrier 12 is therefore displaced from its rest position to its operating position, situating the deflectors 13 in the region of the slides of the magazines 2, so that the deflectors 13 now engage and deflect the slides which immediately precede and immediately follow the slide-changing means 6 away from the slide which is in the operating range of the slide-changing means 6 and in alignment with the guide channel 3. In this way the parts assume the position described above in connection with FIG. 5. The deflector carrier 12 thus finally reaches the position shown in solid lines in FIGS. 6 and 7. In the meantime, the portion 41 of the gear 35 which does not have any teeth has turned beyond the gear 19 so that the gear 35 now turns the gear 19 and again drives the slide-changing means 6. The slide-changing means 6 now engages with its part 15 the one slide which is in the operating range of the slide-changing means. The immediately preceding and immediately following slides are reliably maintained by the deflectors 13 beyond the operating range of the part 15. The slide-changing means 6 and the deflector carrier 12 now move toward the window 4 and finally reach, when the driving disc 38 stops rotating and the gears 35 and 36 thus stop turning, their starting position referred to above where the next slide is located in the projecting position shown in dotted lines in FIG. 6 in alignment with the window 4.

If the magazine 2 accommodates, not slides of minimum thickness as shown in FIGS. 6 and 7, but rather slides of intermediate or even maximum thickness, then there is insufficient space between the slides to permit the deflectors 13 to reach the operating position shown in FIGS. 6 and 7. The movement of the deflectors 13 toward this operating position can be automatically terminated at any point, however, when these deflectors 13 encounter an obstruction formed by such thicker slides, because the resistance to the movement of the deflector pins 13 will simply result in deflection of the leaf spring 29 by the pin 23 during rotary movement of the gear 22, so that in this way the yieldable transmission means formed by the leaf spring 29 which is mounted on the arm 27, as described above, provides for automatic yielding of the transmission when the deflectors 13 encounter such an obstruction. Thus, when the pins 13 encounter an obstruction before they reach their operating position, the carrier 12 will simply stop moving while the pin 23 deflects the leaf spring 29 during continued movement of the pin 23 along its circular path 24, and this operation will continue until the pin 23 again engages the arm 27 at its rigid edge which defines part of the control slot 26.

Thus, with the above-described structure of the invention, restriction of the slide-changing operations only to that particular one of the slides which should be shifted to the projection position is assured.

The above-described structure of the invention can, in contrast to the features described above in FIGS. 5–7 which illustrate the operations in connection with a circular magazine, also be used without any particular structural changes with projectors which are designed for use with straight magazines.

What is claimed is:

1. In a photographic projector a magazine for holding slides in spaced relation, and having two successive compartments, slide-changing means having slide pushing means of width less than the space between said successive compartments; said slide-changing means having an operating cycle during which said slide-changing means moves a slide from a magazine to a projecting position and then back to the magazine, a deflector carrier, a pair of deflectors carried by said carrier, and drive means operatively connected with said deflector carrier for moving the latter during said operating cycle of said slide-changing means from a rest position where said deflectors are situated beyond the range of slides in the magazine to an operating position where said deflectors respectively deflect slides which immediately precede and immediately follow the slide acted upon by said slide-changing means away from the latter slide, to prevent said slide-changing means from engaging said immediately preceding or immediately following slides.

2. The combination of claim 1 and wherein means are provided for supporting the slide-changing means and the deflector carrier for back and forth motion in the same direction.

3. The combination of claim 2 and wherein said deflector carrier is slidably supported on said slide-changing means.

4. The combination of claim 1 and wherein a second drive means is operatively connected with said slide-changing means for driving the latter, and motion-transmitting means operatively connected with and common to both of said drive means for transmitting motion thereto.

5. The combination of claim 4 and wherein a yieldable transmission means is operatively connected with and transmits motion from said first-mentioned drive means to said deflector carrier for yielding automatically when said deflectors encounter an obstruction before said carrier and deflectors reach their operating position.

6. The combination of claim 1 and wherein a yieldable transmission means is operatively connected with said drive means and carrier for transmitting movement of said drive means to said carrier, said transmission means automatically yielding when said deflectors encounter an obstruction before reaching said operating position.

7. The combination of claim 6 and wherein said drive means includes a rotary drive member and said yieldable transmission means including a pin fixed to said rotary member for rotation therewith and a leaf spring fixed to said deflector carrier and transmitting motion from said pin to said carrier except when said deflectors encounter an obstruction, whereupon said leaf spring yields automatically without displacing said carrier.

8. The combination of claim 1 and wherein said drive means maintains said deflector carrier in said rest position thereof during that part of said operating cycle of said slide-changing means when said slide-changing means returns a slide to the magazine and the latter is advanced to situate the next following slide in position to be acted upon by the slide-changing means during its next operating cycle.

References Cited

UNITED STATES PATENTS 2,840,941   7/1958   Badalick _____ 40—79
3,170,370   2/1965   Mulch _____ 40—79 X EUGENE R. CAPOZIO, *Primary Examiner.*

R. CARTER, *Assistant Examiner.*